United States Patent [19]

Nakamura et al.

[11] 4,210,943
[45] Jul. 1, 1980

[54] AUTOMATIC TRACKING SERVO CONTROL SYSTEM

[75] Inventors: Tadahiko Nakamura, Kanagawa; Kenji Nakano, Yokohama, both of Japan

[73] Assignee: Sony Corporation, Tokyo, Japan

[21] Appl. No.: 940,269

[22] Filed: Sep. 7, 1978

[30] Foreign Application Priority Data

Sep. 8, 1977 [JP] Japan .................. 52-107233

[51] Int. Cl.$^2$ .................. G11B 21/10; G11B 15/46
[52] U.S. Cl. .................. 360/70; 360/73; 360/77
[58] Field of Search .................. 360/70, 73, 77

[56] References Cited

U.S. PATENT DOCUMENTS

| 3,654,387 | 4/1972 | Louth | 360/70 |
|---|---|---|---|
| 3,663,763 | 5/1972 | Trost | 360/70 |
| 3,663,764 | 5/1972 | Trost | 360/70 |
| 3,764,755 | 10/1973 | Yamashita | 360/70 |
| 4,104,684 | 8/1978 | Wakami | 360/70 |
| 4,127,881 | 11/1978 | Wakami | 360/70 |

Primary Examiner—Bernard Konick
Assistant Examiner—Alan Faber
Attorney, Agent, or Firm—Lewis H. Eslinger; Alvin Sinderbrand

[57] ABSTRACT

An automatic tracking servo control system which is adapted to control the tracking of at least one rotary signal reproducing head which scans successive parallel record tracks on a movable record medium. Position pulses are generated when the at least one head rotates into predetermined position with respect to the record medium, and these position pulses are used in conjunction with control signals which are reproduced from the record medium and which had been recorded at spaced locations therealong in predetermined relation to the record tracks for controlling the position of the at least one head with respect to the tracks scanned thereby. A detector detects the relative strength of the signal reproduced by the at least one head during periodic intervals. A phase shift circuit shifts the phase of each reproduced control signal as a function of the difference between the relative signal strengths in successive periodic intervals. The phase-shifted control signal is used in a servo circuit, together with the position pulses, to control the tracking of the rotary head.

19 Claims, 23 Drawing Figures

AUTOMATIC TRACKING SERVO CONTROL SYSTEM

BACKGROUND OF THE INVENTION

This invention relates to an automatic tracking servo control system for use in reproducing apparatus wherein at least one rotary head scans successive parallel record tracks on a movable record medium to reproduce information therefrom and, more particularly, to such a system wherein proper tracking control is attained even if certain parameters which had been present during recording are changed during reproduction.

As is known, a wide-band signal can be recorded advantageously on a movable record medium by use of one or more rotary heads which scan parallel tracks across the record medium. One example of such a wideband signal is a video signal, for example, a composite color video signal, and one example of recording apparatus of the aforementioned type is a video tape recorder (VTR). In a typical VTR, the recording head or heads are rotated at a relatively high rate while the tape is moved so as to record skewed, parallel tracks. The recorded information is reproduced by scanning such record tracks with one or more rotary playback heads. As is conventional, the same head, or magnetic transducer, which is used to record signals also can be used to reproduce such signals.

It is appreciated that, in order to obtain an accurate reproduction of the signals which are recorded in parallel tracks, a proper relationship must exist between the rotary head, or heads, and the track being scanned. That is, the head or heads must be rotated at the same speed during a reproducing operation as during a recording operation; and the magnetic tape likewise must be transported at the same speed during both a recording and a reproducing operation. Still further, each head must be positioned so as to sweep across the particular record track which is being scanned. To achieve this, a typical VTR includes a tracking servo system.

In a reproducing operation, the aforementioned tracking servo system is operated so as to control the relative movement between the rotary head or heads and the magnetic tape. Generally, the head or heads are rotated at a fixed, precisely controlled speed. Hence, the servo system is effective to control the speed at which the tape is transported. This tape speed is adjusted, if necessary, in order to bring the heads into exact alignment with the tracks being scanned. To accomplish this, position pulses are generated when the head or heads rotate into predetermined positions relative to the tape. For example, when a head rotates into contact with the tape, a position pulse is generated when the head first reaches the tape. Furthermore, a series of control pulses which had been recorded in predetermined, spaced position along the length of tape, are reproduced and used in conjunction with the position pulses to control the relative movement, and thus position, of the heads and tape. Typically, each control pulse is recorded so as to be spaced a predetermined amount from a corresponding record track. When the control pulses are reproduced, each exhibits a predetermined phase shift with respect to a position pulse. Consequently, a proper tracking relation is achieved if this predetermined phase relation is maintained. The tracking servo system functions to adjust the transport speed of the tape in order to maintain this phase relation.

A tracking servo system of the type described above generally operates satisfactorily if the same recording machine that had been used to record the signal information also is used to reproduce that information. However, if different machines are used for recording and reproduction, or if various operating parameters change from the recording operation to the reproducing operation, the tracking servo system might perform less than satisfactorily. For example, if different machines are used, the speed of the rotary heads in one machine may differ from that in the other. Also, if the respective machines are of the so-called "helical-scan" type, the length and angle of the respective head scanning traces may differ. Still further, the recorded tape may stretch or shrink prior to the time that the information thereon is reproduced. These factors, as well as others not mentioned herein, will impede the satisfactory operation of the tracking servo system so as to hinder a proper servo "lock".

To account for the aforementioned factors, a manual adjustment may be provided in order to manually change the phase relation between the reproduced control pulses and the generated position pulses. For example, a potentiometer may be provided to adjust the phase of the control pulse. That is, in order to obtain a servo locked condition, the reproduced control pulse may be delayed by an adjustable amount so as to exhibit a new phase relation with respect to a position pulse. It is this new phase relation which results in the aforementioned servo lock condition. Such a manual adjustment may require great care from a skilled technician. It may be exceedingly difficult to effect the desirable manual adjustment by the user of, for example, a home-entertainment VTR.

OBJECTS OF THE INVENTION

Therefore, it is an object of the present invention to provide an improved tracking servo control system for use in signal reproducing apparatus of the type wherein recorded control signals are reproduced from a record medium while at least one rotary head scans parallel record tracks which have been recorded on that medium.

Another object of this invention is to provide an improved tracking servo control system of the aforedescribed type wherein reproduced control pulses are used in conjunction with position pulses, the latter representing the position of the rotary head, in order to control the head to scan parallel record tracks precisely.

A further object of this invention is to provide an automatic tracking servo control system of the aforedescribed type wherein the phase relation between the reproduced control signals and the position pulses is adjusted automatically to compensate for various factors which might otherwise prevent proper tracking.

An additional object of this invention is to provide an improved servo control system of the aforedescribed type wherein the reproduced control signal automatically is phase-shifted in order to attain a proper servo lock.

Yet another object of this invention is to provide an improved automatic tracking servo control system of the aforedescribed type which functions automatically to accomplish the same objective as tracking servo control systems which heretofore relied upon manual adjustments in order to attain proper tracking control of a rotary head with respect to parallel record tracks.

Various other objects, advantages and features of the present invention will become readily apparent from the ensuing detailed description, and the novel features will be particularly pointed out in the appended claims.

SUMMARY OF THE INVENTION

In accordance with this invention, a servo control system is provided for controlling the tracking of at least one rotary signal reproducing head which scans successive parallel record tracks on a movable record medium. A position pulse generator generates position pulses when the head rotates into a predetermined position with respect to the record medium, and a control transduder reproduces control signals which have been recorded along the record medium in predetermined, spaced relation with respect to the tracks. The position pulses and control signals are used in combination to control the relative position of the head with respect to the tracks scanned thereby. A detector detects the relative strength of the signal reproduced by the head during periodic intervals. A phase shift circuit shifts the phase of each reproduced control signal as a function of the difference between the relative signal strengths in successive periodic intervals. The phase-shifted control signals are used to lock the tracking condition of the rotary head.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1A:
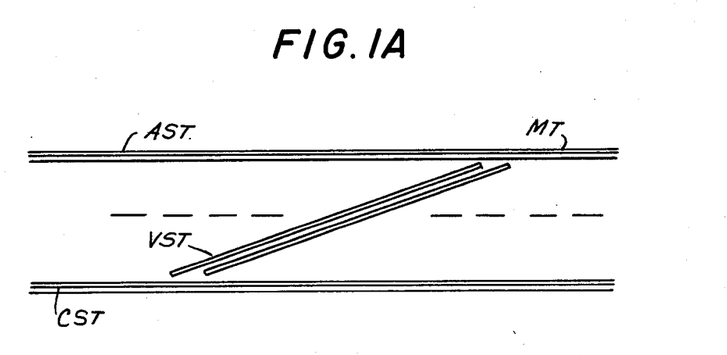
FIG. 1A is a diagramatic representation of a portion of a record medium to which the present invention is applicable.

As will become apparent from the following description, the present invention is readily applicable to signal reproducing apparatus in general wherein one or more rotary heads scan parallel tracks across a movable record medium. A particular example of such apparatus is described herein is a video tape recorder (VTR) wherein two heads spaced 180° apart are rotated to scan parallel skewed tracks across magnetic tape. Typically, the tape is deployed about a guide drum upon which the rotary heads are mounted. In a typical VTR, the tape is helically wrapped about the periphery of the guide drum to exhibit a wrap angle of at least 180°. In this configuration, the information recorded on the magnetic tape appears as shown in FIG. 1A. As illustrated, magnetic tape MT has a plurality of parallel, skewed video signal tracks VST recorded thereon, each video track containing the video information included in a field interval. Adjacent video tracks VST may be separated from each other by a guard band, as shown in FIG. 1A; or, alternatively, adjacent tracks may be in abutting or even overlapping relation, as is known to those of ordinary skill in the video recording art. An audio signal track AST is recorded along one longitudinal edge of magnetic tape MT, and a control signal track CST is recorded along the other longitudinal edge of the magnetic tape. As one example thereof, a control pulse may be associated with every other video track. That is, one control pulse is recorded for each frame interval of video signals. Moreover, the control pulse which is associated with a particular video track is recorded in a particular, spaced apart location in control signal track CST relative to its associated video signal track VST. This spaced apart, or phase, relation is such that when a rotary magnetic transducer, such as a playback head, rotates into magnetic contact with magnetic tape MT, an associated control pulse is reproduced from control signal track CST by a separate, fixed control signal transducer. As will be described, for proper tracking control, this relation between the rotary playback head and the reproduced control pulse is maintained during the reproducing operation.

Figure 1B:
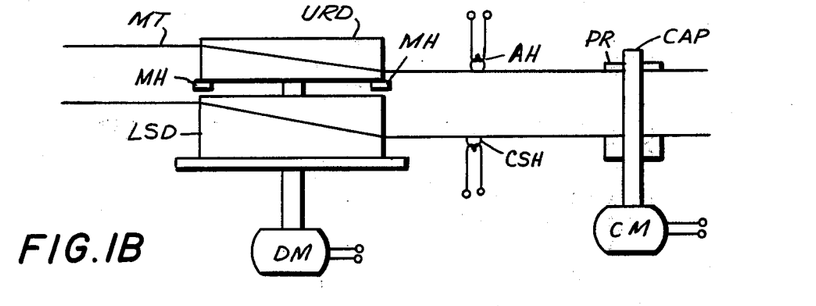
FIG. 1B is a diagramatic representation of the recording/reproducing apparatus with which this invention can be used.

A diagramatic representation of the apparatus which is used to record/reproduce information onto/from magnetic tape MT is shown in FIG. 1B. A guide drum is formed of a lower stationary drum LSD and an upper rotary drum URD, the upper rotary drum being provided with a pair of magnetic heads MH spaced apart from each other by 180°. Magnetic tape MT is helically wrapped about the surface of the guide drum so as to be disposed about a portion of each of lower drum LSD and upper drum URD, as shown. As one example, magnetic tape MT is helically wrapped about the guide drum by an angle of about 180°.

A drum motor DM is coupled to and rotary drives a shaft which is mechanically coupled to upper rotary drum URD. Drum motor DM drives upper rotary drum URD at an angular velocity of thirty rotations per second. It is seen that two video signal tracks VST are scanned across the surface of magnetic tape MT for each rotation of upper rotary drum URD. Hence, in one second, sixty tracks are scanned.

As drum motor DM drives upper rotary drum URD, magnetic tape MT is transported by the combination of a capstan CAP and a pinch roller PR. In conventional manner, pinch roller PR is urged against capstan CAP to engage magnetic tape MT therebetween. A capstan motor CM is mechanically coupled to capstan CAP to drive the capstan at a desired transport speed.

As also shown in FIG. 1B, an audio head AH is disposed in alignment with audio signal track AST so as to record audio signals therein during a recording operation. The audio head AH also may be operated to reproduce audio signals from audio signal track AST during a reproducing operation. Similarly, a control signal head CSH is positioned in alignment with control signal track CST so as to record the aforementioned control signals in the control signal track during a recording operation. The same, or a similar, control signal head CSH may be used to reproduce the recorded control signals during a reproducing operation. As will be described below, the combination of the reproduced control signals, or pulses, and the sensed position of magnetic heads MH is used to control the tracking relation of the magnetic heads with respect to video signal tracks VST. As mentioned previously, a control pulse is recorded for every other video signal track. Hence, during a recording operation, control signal head CSH records pulses at the rate of 30 Hz longitudinally spaced along control signal track CST.

Figure 1C:
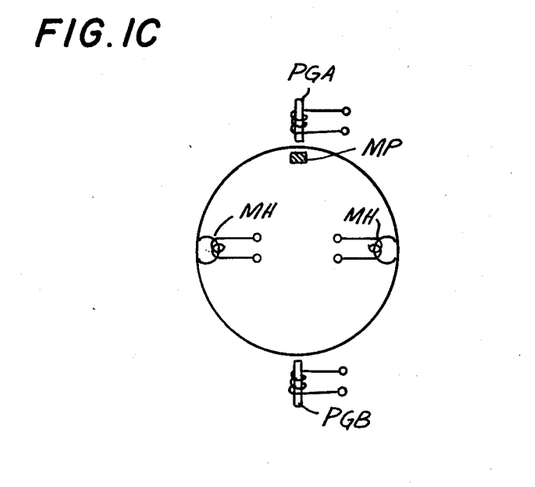
FIG. 1C is a diagramatic plan view of the rotary scanning apparatus with which the present invention is used.

FIG. 1C is a top plan diagramatic view of upper rotary drum URD. It is seen that magnetic heads MH are mounted in diametrically opposed relation with respect to each other. In order to detect the positions of these magnetic heads, a magnetic element MP is mounted on upper rotary drum URD. This magnetic element may be positioned along any radial line; and in FIG. 1C is illustrated as being secured to the periphery of the upper rotary drum. Hence, as the upper rotary drum is driven by drum motor DM, magnetic heads MH as well as magnetic element MP rotate. A pair of oppositely disposed magnetic sensors PGA and PGB are provided adjacent upper rotary drum URD. As examples, these sensors may be magnetic coils or other conventional magnetic pick-up devices adapted to generate a pulse when magnetic element MP is rotated therepast. Thus, as upper rotary drum URD rotates, sensor PGA functions as a position pulse generator to generate a position pulse PGA' when one of the magnetic heads rotates to a predetermined position, such as into magnetic contact with magnetic tape MT. Then, when the other magnetic head rotates into this predetermined position, sensor PGB functions as a position pulse generator to generate a position pulse PGB' when magnetic element MP rotates therepast. It is appreciated that the repetition rate of each of position pulses PGA' and PGB' is equal to the rotational speed of upper rotary drum URD, i.e., 30 Hz. These position pulses are 180° out-of-phase with respect to each other because of the diametrically opposite positions of position pulse generators PGA and PGB.

Figure 2:
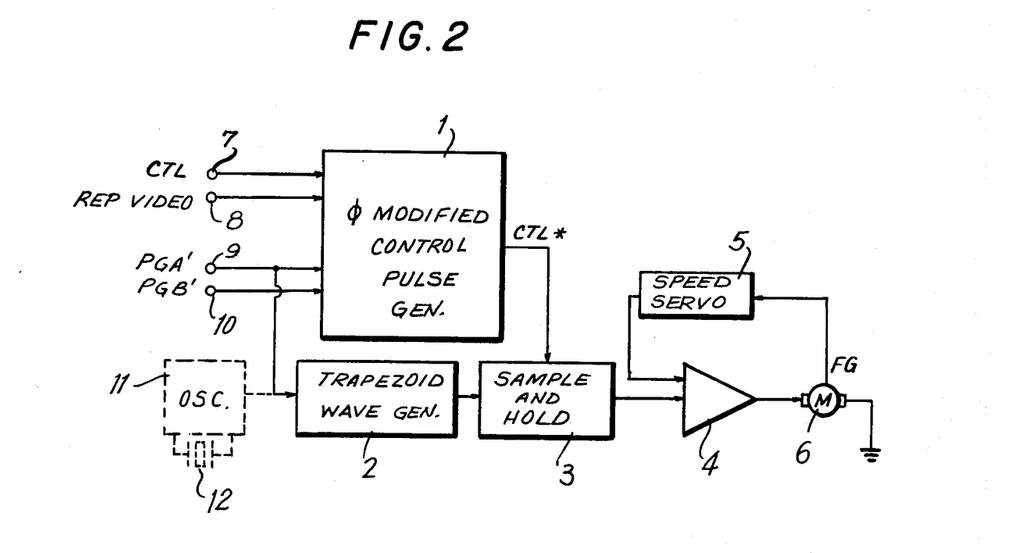
FIG. 2 is a block diagram of a servo control system which incorporates the present invention.

Referring now to FIG. 2, there is illustrated a block diagram of a tracking servo control system which utilizes the position pulses generated by position pulse generators PGA and PGB as well as the control pulses reproduced by control signal head CSH and which incorporates the present invention. This tracking servo control system includes a phase-modified control pulse generator 1, a trapezoid wave generator 2, a sample-and-hold circuit 3, a speed servo circuit 5 and a motor 6. Phase-modified control pulse generator 1 is shown and described in greater detail hereinbelow with respect to the embodiment illustrated in FIG. 4. This phase-modified control pulse generator includes input terminals 7, 8, 9 and 10 for receiving a control pulse CTL reproduced by control signal at CSH, a video signal reproduced by magnetic heads MH, and position pulses PGA' and PGB', respectively. These signals are utilized by phase-modified control pulse generator 1 to produce a phase-modified control pulse CTL*. As will be explained below, phase-modified control pulse CTL* is phase shifted with respect to reproduced control pulse CTL in order to achieve a tracking servo lock condition even though one or more of the factors mentioned hereinabove may be present to impede such a servo lock condition.

Trapezoid wave generator 2 is coupled to input terminal 9 to receive position pulses PGA'. The trapezoid wave generator may be a conventional circuit including RC charging and discharging circuits for generating a trapezoidal waveform having sloping leading and trailing edges, respectively. Alternatively, trapezoidal waveform generator 2 may be replaced by a sawtooth generator. The output of the trapezoidal waveform generator is coupled to sample-and-hold circuit 3, this circuit additionally being supplied with phase-modified control pulse CTL*. The phase-modified control pulse CTL* is used to sample the trapezoidal waveform produced by trapezoidal waveform generator 2. For example, the phase-modified control pulse may sample the leading edge of the trapezoidal waveform. Hence, the magnitude of the sampled signal is dependent upon the phase relation between position pulse PGA' and phase-modified control pulse CTL*.

The sampled trapezoidal waveform is stored in sample-and-hold circuit 3 and supplied via drive amplifier 4 to motor 6. This motor may correspond to capstan motor CM (FIG. 1B) whose speed is controlled to correspondingly control the transport speed of magnetic tape MT. Thus, the speed of motor 6 may be increased or decreased so as to change the phase relation between phase-modified control pulse CTL* and position pulse PGA' in order to bring this phase relation into its desired condition.

The speed of motor 6 also is controlled to be equal to a desired, constant speed by a speed servo circuit 5. The actual speed of motor 6 may be represented by a train of speed-representing pulses FG, generated by any suitable sensing apparatus (not shown). These speed-representing pulses FG are supplied to speed servo circuit 5 which functions to generate a control signal that also is supplied through drive amplifier 4 to motor 6 for regulating the speed of this motor. Hence, the tracking control system shown in FIG. 2 is illustrated as cooperating with speed servo circuit 5 to control motor 6. The tracking control system may be thought of as controlling the position of magnetic tape MT relative to rotary heads MH, that is, the position of the video signal tracks VST recorded on the magnetic tape, and speed servo circuit 5 may be thought of as controlling the transport speed of the magnetic tape.

Figure 3A:
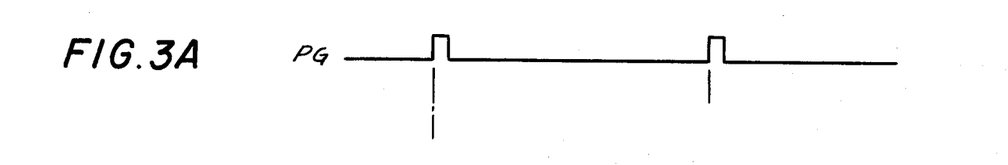
FIGS. 3A–3C are waveform diagrams which are useful in understanding the operation of the servo control system shown in FIG. 2.
Figure 3B:
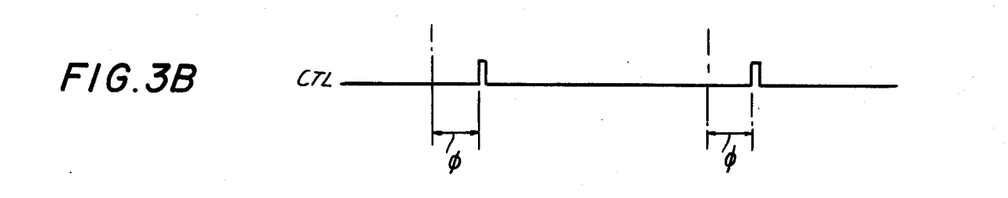

Assuming that speed servo circuit 5 controls the operating speed of motor 6 to be equal to a desired, substantially fixed speed, the principle of operation of the tracking control servo system is explained with reference to the waveforms shown in FIGS. 3A–3C. When one of magnetic heads MH rotates into predetermined position with respect to magnetic tape MT, a corresponding position pulse PG, shown in FIG. 3A, is generated. This position pulse is generated either by position pulse generator PGA or position pulse generator PGB, shown in FIG. 1C. As a particular track is scanned by magnetic head MH during a reproducing operation, a control pulse CTL (FIG. 3B) is reproduced by control signal head CSH. It is seen that the phase difference between position pulse PG and control pulse CTL is represented as $\phi$. Let it be further assumed that this phase difference $\phi$ is the correct phase relation between the position and control pulses such that when this phase relation obtains, magnetic heads MH always will scan the video signal tracks VST correctly. If this phase relation changes, the speed of capstan motor CM, for example, the speed of motor 6, is changed so as to restore the proper phase relation $\phi$ as seen from FIGS. 3A and 3B.

Figure 3C:
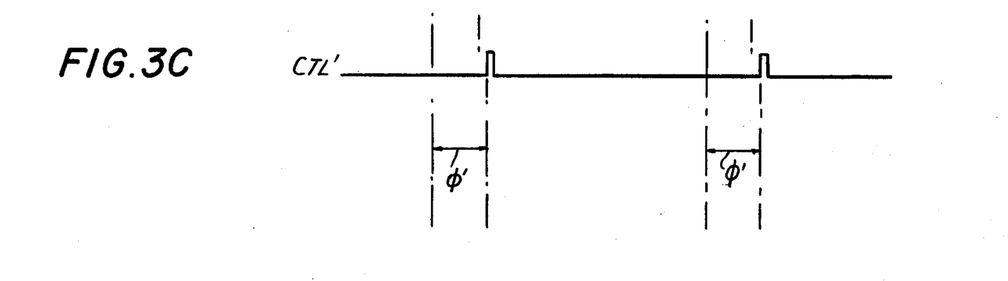

If, because of tape shrinkage or tape stretching, or because of other factors mentioned above, the phase relation $\phi$ will result in erroneous tracking of the record tracks by magnetic heads MH, it is necessary to change this predetermined phase relation. That is, if the phase difference $\phi$, shown in FIGS. 3A and 3B, is maintained, heads MH will not scan the video signal tracks VST properly. However, the tracking servo control system functions to maintain this phase difference $\phi$. Hence, in order to utilize the tracking servo control system, yet account for tape shrinkage, tape stretching or any of the other aforementioned factors, control pulse CTL must be phase-modified so as to exhibit a phase difference $\phi'$ with respect to position pulse PG, as shown in FIGS. 3A and 3C. Heretofore, a manual control element has been adjusted to impart a phase delay to control pulse CTL in order to produce phase-delayed control pulse CTL' (FIG. 3C) of proper phase relation $\phi'$. However, it is difficult to effect this phase delay by a manual adjustment. This is because the manual adjustment is dependent upon the perceived maximum video signal level, as viewed from the displayed video picture. Consequently, not only would such a manual phase adjustment be troublesome for a skilled technician, it would be exceedingly difficult for the user of a home-entertainment type VTR.

In accordance with this invention, proper phase adjustment of control pulse CTL is achieved automatically by phase-modified control pulse generator 1. This phase-modified control pulse generator shifts the phase of control pulse CTL to produce a phase-modified control pulse CTL*. The phase-modified control pulse CTL* may exhibit the phase relation $\phi'$ exhibited by phase-delayed control pulse CTL' shown in FIG. 3C. In accordance with one aspect of this invention, the phase of phase-modified control pulse CTL* is shifted periodically to correspondingly shift the tracking condition of the magnetic heads relative to the video signal tracks and thereby permit the detection of the difference in the level of the video signals reproduced by magnetic heads MH during two successive periodic intervals. Although the tracking condition can be sensed by detecting any deviation between the reproduced video signal and the maximum signal level, it is difficult to provide circuitry which detects the maximum video signal level over a period of time. Hence, the phase of the phase-modified control pulse CTL* oscillates, or hunts, about the desired phase difference $\phi'$ (FIG. 3C) by small amounts in periodic intervals. By this technique, the phase relation between the position pulses PG and the phase-modified control pulses CTL* closely approximates the desired, fixed phase relation $\phi'$. Thus, the tracking servo control system shown in FIG. 2 automatically controls the relative position of magnetic heads MH and the video signal tracks VST scanned thereby. This position insures proper tracking of the successive video signal tracks by the rotary magnetic heads.

In the embodiment shown in FIG. 2, it is assumed that trapezoidal waveform generator 2 is driven by position pulse PGA'. Alternatively, a crystal-controlled oscillator 1, having a crystal element 12, can be used to drive the trapezoidal waveform generator. In this alternative embodiment, drum motor DM is synchronized with crystal oscillator 11 such that the pulses generated by the oscillator are accurate indications of the position of magnetic heads MH.

Figure 4:
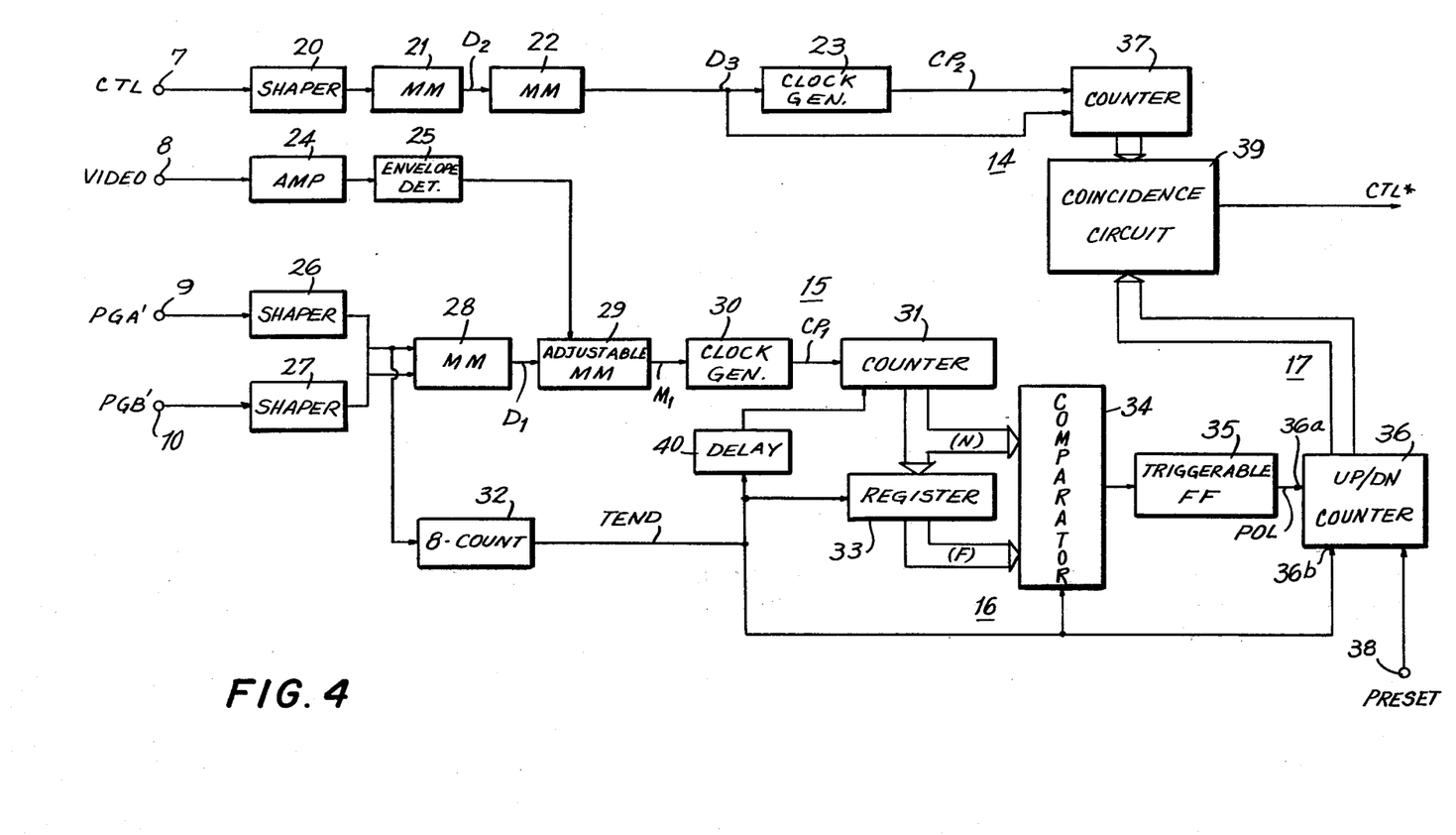
FIG. 4 is a block diagram of one embodiment of the present invention.

Turning now to FIG. 4, there is illustrated a block diagram of a preferred embodiment of phase-modified control pulse generator 1. This phase-modified control pulse generator includes a phase shift section 14, a signal level measuring section 15, a level-difference section 16 and a phase control section 17. Phase shift section 14 includes a shaping circuit 20, monostable multivibrators 21 and 22, a clock generator 23, a counter 37 and a coincidence circuit 39. Shaping circuit 20 is coupled to input terminal 7 for receiving the reproduced control pulse CTL. The shaping circuit is adapted to shape the reproduced control pulse to a proper pulse waveform. The output of shaping circuit 20 is coupled to monostable multivibrator 21 for triggering the latter by the shaped control pulse. Monostable multivibrator 21 is adapted to produce a delay pulse $D_2$ which, in turn, triggers monostable multivibrator 22. The latter monostable multivibrator, when triggered, functions to produce a window pulse $D_3$ which, in turn, is supplied to clock generator 23 and also to counter 37. As one example thereof, clock generator 23 may be a triggerable pulse oscillator responsive to the leading edge of window pulse $D_3$ to generate timing pulses $CP_2$, and responsive to the trailing edge of the window pulse to terminate the generation of the timing pulses. One embodiment of clock generator 23 may include an astable multivibrator whose output is coupled to a gating circuit which is conditioned by window pulse $D_3$. Another embodiment of clock generator 23 is described in greater detail hereinbelow with respect to FIG. 6. The timing pulses $CP_2$ generated by clock generator 23 are supplied to counter 37 to increment the count thereof. Window pulse $D_3$ also is supplied to counter 37 for resetting the count of this counter to an initial count, such as zero. Counter 37 may comprise a conventional multi-stage counter capable of counting to, for example, 32. The count of counter 37 is supplied to one set of input terminals of coincidence circuit 39. The other set of input terminals of coincidence circuit 39 receive a phase control signal supplied by phase control section 17, to be described. The output of coincidence circuit 39 is a phase-modified control pulse CTL*.

Signal level measuring circuit 15 includes an envelope detector 25, shaping circuits 26 and 27, monostable multivibrator 28, an adjustable monostable multivibrator 29, a clock generator 30 and a counter 31. Envelope detector 25 is coupled to input terminal 8 via a buffer amplifier 24 for receiving the reproduced video signal from magnetic heads MH. As one example thereof, the video signal may be recorded as a frequency modulated signal. Hence, input terminal 8 may be supplied with the reproduced frequency modulated video signal. If the video signal is recorded in accordance with other techniques, it should be appreciated that this recorded video signal is supplied to input terminal 8 by magnetic heads MH, and the envelope thereof is detected by envelope detector 25. The envelope detector may, alternatively, be an averaging circuit, such as an integrating circuit, capable of generating an output signal which represents the average level of the reproduced video signal. In any event, the output signal produced by envelope detector 25 represents the strength, or magnitude, of the reproduced video signal. The output of envelope detector 25 is coupled to adjustable monostable multivibrator 29.

Shaping circuits 26 and 27 are coupled to input terminals 9 and 10 for receiving position pulses PGA' and PGB', respectively. Shaping circuits 26 and 27 may be similar to aforementioned shaping circuit 20 and function to shape the position pulses supplied thereto to proper pulse waveform. The outputs of shaping circuits 26 and 27 are connected to monostable multivibrator 28 for triggering this monostable multivibrator in response to the generation of position pulse PGA' or position pulse PGB'. Hence, as is appreciated, the frequency of the output pulse, designated a delay pulse $D_1$, produced by monostable multivibrator 28 is equal to twice the frequency of position pulses PGA' or twice the frequency of position pulses PGB'. Although not shown herein, shaping circuits 26 and 27 may be connected in common to a single input of monostable multivibrator 28 or, alternatively, the outputs of these shaping circuits may be supplied to the monostable multivibrator by an OR gate.

The trailing edge of delay pulse $D_1$ produced by monostable multivibrator 28 is, of course, delayed with respect to position pulses PGA' and PGB'. As will be explained below, the trailing edge of delay pulse $D_1$ occurs in the vicinity of the central portion of a video signal track VST scanned by one of the magnetic heads MH. This trailing edge of the delay pulse $D_1$ is adapted to trigger adjustable monostable multivibrator 29 such that the latter produces a clock control pulse $M_1$. The duration of this clock control pulse is determined by the amplitude of the envelope-detected signal supplied to the adjustable monostable multivibrator by envelope detector 25. For example, the adjustable monostable multivibrator may include a voltage-controlled time delay circuit whose time delay, and thus the duration of the clock control pulse $M_1$, is determined by the output voltage produced by envelope detector 25. This time delay increases as the detected envelope increases, thus increasing the duration or width of the clock control pulse $M_1$. Conversely, as the detected envelope decreases, the time delay of the time delay circuit included in adjustable monostable multivibrator 29 also decreases so as to reduce the duration or width of the clock control pulse.

The output of adjustable monostable multivibrator 29 is coupled to clock generator 30. This clock generator may be similar to clock generator 23 and is adapted to generate a train of clock pulses $CP_1$ in response to the leading edge of clock control pulse $M_1$, and to terminate the generation of these clock pulses $CP_1$ in response to the trailing edge of the clock control pulse. As one example thereof, clock generator 30 may comprise an astable multivibrator whose output is connected to a gate circuit which, in turn, is enabled by clock control pulse $M_1$. Thus, it is appreciated that the number of clock pulse $CP_1$ which is generated during the duration of clock control pulse $M_1$ is, of course, dependent upon the width of this clock control pulse. It is seen that the width of clock control pulse $M_1$ is a function of the detected envelope, or strength, of the reproduced video signal.

The output of clock generator 30 is coupled to counter 31. This counter is adapted to count the clock pulses $CP_1$ which are generated by the clock generator. Hence, the count of counter 31 represents the duration of clock control pulse $M_1$ which is seen to be a representation of the signal strength of the reproduced video signal.

Level-difference section 16 includes a storage register 33 and a comparator 34. Storage register 33 is adapted to store the contents of counter 31. In particular, the storage register includes a load input for receiving a load pulse so as to enable the storage register to store the contents of the counter. The load pulse which is supplied to storage register 33 is designated herein as an end-of-period pulse TEND, which is generated periodically. This end-of-period pulse TEND also is supplied to counter 31 via a delay circuit 40 for resetting the counter to an initial, or zero, count. It is appreciated that, prior to resetting counter 31, the contents thereof are transferred to storage register 33.

The output of counter 31, that is, the count accumulated therein, and the output of storage register 33, that is, the count which had been transferred thereto, are supplied to comparator 34. This comparator functions to determine whether the count stored in storage register 33 exceeds the count in counter 31. Thus, the comparator compares the previously transferred count to the presently attained count. If the previous count exceeds the present count, an output pulse is generated by comparator 34. However, if the present count exceeds the previous count, no output pulse is generated by the comparator. As shown, end-of-period pulse TEND is supplied to comparator 34 to energize the comparator. As one example, the trailing edge of end-of-period pulse TEND may trigger storage register 33 to store the contents of counter 31, while the leading edge of this end-of-period pulse may energize comparator 34. The time delay imparted by delay circuit 40 may be selected to be greater than the duration of end-of-period pulse TEND.

As mentioned previously, the end-of-period pulse TEND is generated periodically. As one example, this end-of-period pulse may be generated after at least two tracks have been scanned by magnetic heads MH. Since this end-of-period pulse TEND serves to reset counter 31, it is appreciated that the count attained by this counter is representative of the strength of the video signal which is reproduced from two tracks. This count thus may be considered to be representative of the average signal strength from these two tracks. Of course, if the end-of-period pulse TEND is generated after four tracks have been scanned, the count attained by counter 31 will represent the signal strength of the reproduced video signal averaged over four tracks. In the embodiment shown in FIG. 4, the end-of-period pulse TEND is generated after sixteen tracks have been scanned. Thus, the count of counter 31, prior to the resetting thereof, represents the signal strength of the video signal which has been reproduced from sixteen tracks. Of course, the count stored in storage register 33 likewise represents the signal strength of the video signal which had been reproduced from the previous group of sixteen tracks. Consequently, it is appreciated that comparator 34 functions to determine the difference between the level of the video signal which has been reproduced from a just-concluded interval of sixteen tracks and the level of the video signal which had been reproduced from the immediately preceding interval of sixteen tracks. The count of counter 31, designated herein as the new count N, represents the average signal strength of the video signal reproduced from the justconcluded interval of sixteen tracks; and the count stored in storage register 33, designated as the former count F, represents the average signal strength of the video signal reproduced during the immediately preceding interval of sixteen tracks.

In order to produce end-of-period pulse TEND at the end of each group of sixteen tracks, an eight-count counter 32 is coupled to shaping circuit 26 for counting the shaped position pulses PGA'. It is recognized that position pulses PGA' are produced once during each rotation of magnetic heads MH and, thus, after two tracks have been scanned. Hence, after eight position pulses PGA' have been counted, a total of sixteen tracks will have been scanned.

Phase control section 17 includes a triggerable flip-flop circuit 35 and an up/down counter 36. Triggerable flip-flop circuit 35 is coupled to comparator 34 and is adapted to be triggered from one to its other state whenever the comparator generates an output pulse. Thus, whenever the former count F stored in storage register 33 exceeds the new count count N attained by counter 31, thus representing that the signal strength of the video signals reproduced during the immediately preceding interval exceeds the signal strength of the video signals reproduced during the just-concluded interval, triggerable flip-flop circuit 35 changes state. The state of the triggerable flip-flop circuit is represented by an up/down control signal POL which is supplied to direction control input 36a of up/down counter 36. The up/down counter also includes a count input 36b for receiving the end-of-period pulse TEND generated at the end of each interval, that is, after sixteen tracks have been scanned, by 8-count counter 32. If triggerable flip-flop circuit 35 is in its first state, for example, if up/down control signal POL is at a relatively higher level, up/down counter 36 is conditoned to count up such that each end-of-period pulse TEND increments the count thereof. Conversely, if the state of triggerable flip-flop circuit 35 is changed such that up/down control signal POL now is at a relatively lower level, up/down counter 36 is conditioned to count down such that each end-of-period pulse TEND decrements the count thereof.

The up/down counter 36 additionally is connected to a preset input terminal 38 for receiving a preset count at the commencement of a reproducing operation. The count of the up/down counter is used as a phase control signal and is supplied to coincidence circuit 39.

Figures 5A, 5B, 5C:
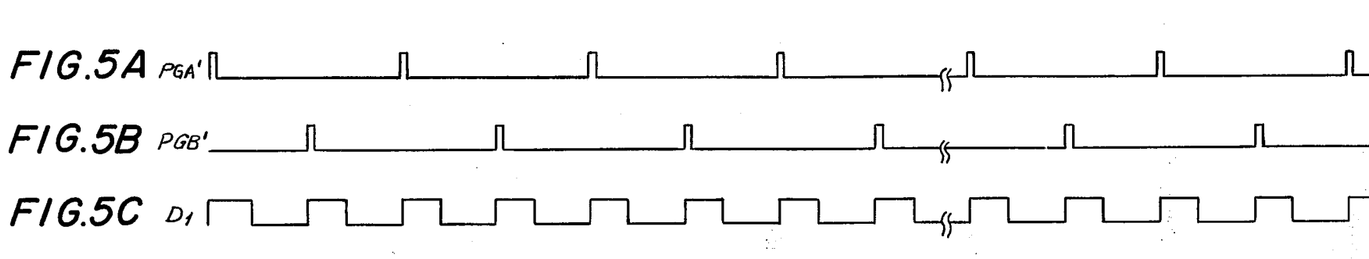
FIGS. 5A–5M are waveform diagrams which are useful in understanding the operation of the embodiment shown in FIG. 4.
Figures 5D, 5E:
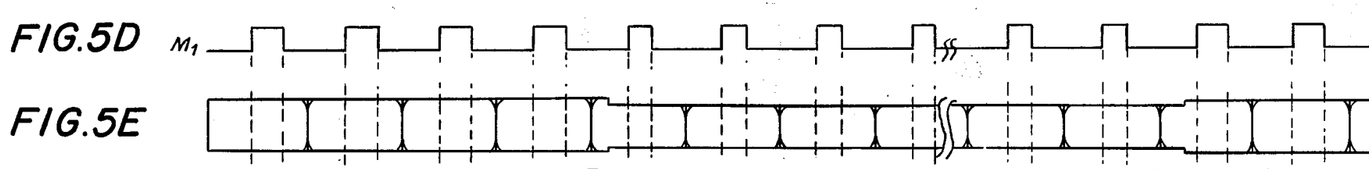

The operation of the phase-modified control pulse generator shown in FIG. 4 now will be described with reference to the waveforms illustrated in FIGS. 5A–5M. Position pulses PGA' and PGB', shown in FIGS. 5A and 5B, are supplied to input terminals 9 and 10 and shaped to proper pulse waveform by shaping circuits 26 and 27. These shaped position pulses trigger monostable multivibrator 28 to generate delay pulse $D_1$, shown in FIG. 5C. Thus, as each video signal track VST is scanned, a delay pulse $D_1$ is produced. The negative transitions in delay pulses $D_1$ trigger adjustable monostable multivibrator 29 to produce clock control pulses $M_1$, as shown in FIG. 5D.

As magnetic heads MH are rotated across magnetic tape MT, the video signals which had been recorded in video signal tracks VST are reproduced therefrom. These reproduced video signals are supplied to input terminal 8, amplified by amplifier 24 and supplied to envelope detector 25. The envelope detector detects the signal strength, or amplitude, of the video signals which are reproduced from each track. FIG. 5E represents the detected envelopes of the reproduced video signals as detected by envelope detector 25. The detected signal strength of the reproduced video signal is used to determine the duration, or width, of clock control pulses $M_1$ produced by adjustable monostable multivibrator 29. As shown in FIG. 5D, if the detected signal strength is reduced, the width of clock control pulses $M_1$ correspondingly is reduced. It is appreciated that the signal strength of the reproduced video signal is a function of the tracking of the video signal track VST by magnetic head MH in which the video signal is recorded. That is, the detected signal strength, i.e., the output of envelope detector 25, is reduced if magnetic head MH is not in proper alignment with video signal track VST.

Figures 5F, 5G:
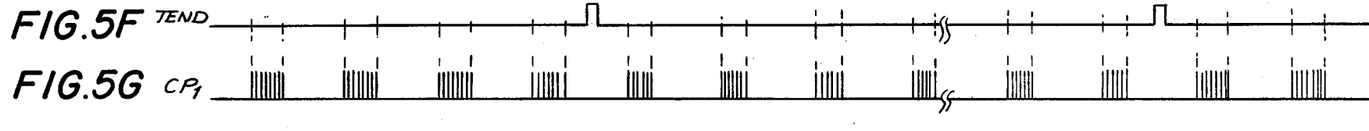

Clock control pulses $M_1$ produced by adjustable monostable multivibrator 29 control clock generator 30 to generate clock pulses $CP_1$, as shown in FIG. 5G. The number of clock pulses $CP_1$ which is generated is determined by the width of clock control pulse $M_1$. These clock pulses are counted by counter 31.

In the embodiment shown in FIG. 4, it is assumed that counter 31 counts the number of pulses which are produced during the scanning of sixteen successive tracks. That is, the periodic interval over which counter 31 is incremented to provide a representation of the signal strength of the reproduced video signal is the interval required to scan sixteen tracks. Hence, eight-count counter 32 is coupled to shaping circuit 26 to count the position pulses PGA'. After eight position pulses have been counted, thus representing a total of sixteen tracks having been scanned, end-of-period pulse TEND is generated, as shown in FIG. 5F. The leading edge of end-of-period pulse TEND actuates comparator 34 to compare the new count N accumulated by counter 31 during the just-concluded interval with the former count F stored in register 33. The trailing edge of the end-of-period pulse TEND triggers storage register 33 to receive and store the new count N reached by counter 31. At this time, the former count F which had been stored in the storage register is discarded. At a delayed time following the trailing edge of end-of-period pulse TEND, counter 31 is reset to an initial count in preparation for a subsequent counting operation.

In the example described herein, let it be assumed that, during the just-concluded interval, magnetic head MH had not been in precise alignment with the video tracks VST scanned thereby. Hence, the strength of the video signals which were reproduced during the just-concluded interval is assumed to be less than the strength of the video signals which had been reproduced during the immediately preceding interval. This means that the width of clock control pulses $M_1$ produced during the just-concluded interval are less than the width of the clock control pulses which had been produced during the immediately preceding interval. Therefore, the number of clock pulses $CP_1$ which are counted by counter 31 is less than the number of clock pulses which had been counted thereby during the immediately preceding interval. Accordingly, the former count F stored in storage register 33 exceeds the new count N which is accumulated by counter 31 during the just-concluded interval. As a consequence thereof, comparator 34 responds to the end-of-period pulse TEND to supply a trigger pulse to triggerable flip-flop circuit 35. The triggerable flip-flop circuit changes its state, as represented by the positive transition in up/down control signal POL, shown in FIG. 5H.

Prior to this positive transition in up/down control signal POL, let it be assumed that the count stored in up/down counter 36 was equal to a count of three. As will now be described, the count of up/down counter 36 determines the particular phase of the phase-modified control pulse CTL* produced by coincidence circuit 39.

Figures 5H, 5I, 5J:
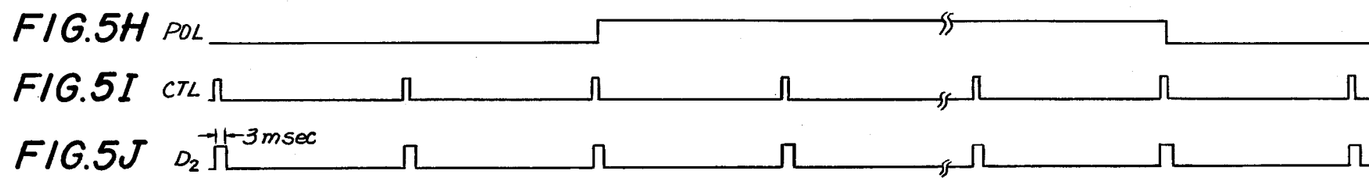
Figure 5K:
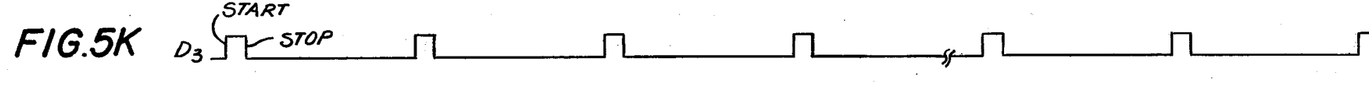

The reproduced control pulse CTL is shown in FIG. 5I. This control pulse is shaped by shaping circuit 20 to proper pulse waveform and then is used to trigger monostable multivibrator 21. Once triggered thereby, monostable multivibrator 21 produces delay pulse $D_2$, as shown in FIG. 5J. It is assumed herein that the positive transition in control pulse CTL triggers the monostable multivibrator. At the conclusion of delay pulse $D_2$, which, for example, may have a duration of 3 msec., the negative transition in the delay pulse triggers monostable multivibrator 22 to generate a window pulse $D_3$ as shown in FIG. 5K. The positive transition of window pulse $D_3$ energizes clock generator 23 to supply timing pulses $CP_2$ to counter 37. The negative transition, or trailing edge, of window pulse $D_3$ de-energizes the clock generator. As one example thereof, clock generator 23 may include an astable multivibrator whose output is connected to a gate circuit, the latter being selectively conditioned by window pulse $D_3$.

Figure 5L:
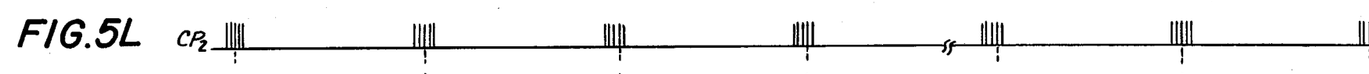
Figure 5M:
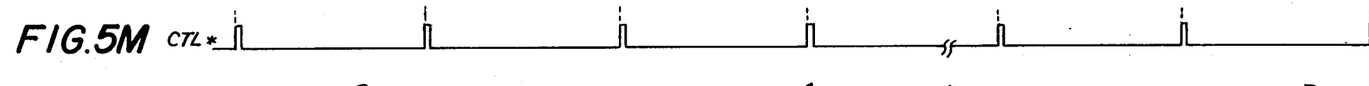

Timing pulses $CP_2$ are counted by counter 37. Immediately prior to the counting of these timing pulses, the leading edge of window pulse $D_3$ resets the count of counter 37 to an initial, for example, zero count. When the count attained by counter 37 is equal to the count in up/down counter 36, coincidence circuit 39 detects the coincidence therebetween to generate phase-modified control pulse CTL*. In the foregoing example, it has been assumed that a count of three is stored in up/down counter 36. Hence, as timing pulses $CP_2$ (FIG. 5L) are counted by counter 37, coincidence circuit 39 generates the phase-modified control pulse CTL* when three timing pulses $CP_2$ have been counted, as shown in FIG. 5M.

It is appreciated that the number of timing pulses which are counted to generate the phase-modified control pulse CTL* determines the relative phase shift of this phase-modified control pulse from the reproduced control pulse. Thus, the count in up/down counter 36 is used to establish this phase shift. It should be appreciated that the range over which the phase-modified control pulse CTL* can be shifted is limited to the duration or width of window pulse $D_3$. Furthermore, the magnitude of the phase shift of the phase-modified control pulse also is determined by the spacing of timing pulses $CP_2$. For example, if timing pulses $CP_2$ exhibit a relatively high frequency, then, for a given count, the phase shift determined by the count in up/down counter 36 will be of a lesser degree than if the frequency of timing pulses $CP_2$ is a lesser frequency.

It is recognized that a window pulse $D_3$ is produced in response to each reproduced control pulse CTL. Hence, a counting cycle is performed by counter 37 once during each rotation of magnetic heads MH, i.e., once during the scanning of every two tracks. It is further appreciated that, since the count of up/down counter 36 is not changed for an interval equal to the time required for scanning sixteen tracks, the phase shift provided in phase-modified control pulse CTL* is a fixed phase shift, determined by the count in the up/down counter, during this interval.

At the completion of the interval during which sixteen tracks are scanned, the end-of-period pulse TEND is produced by eight-count counter 32. Let it be assumed that the signal strength of the reproduced video signal during the just-concluded interval, as measured by the count stored in counter 31, is less than the signal strength of the video signal which was reproduced during the immediately preceding interval, as measured by the count stored in storage register 33. Thus, since the former count F is greater than the new count N, comparator 34 responds to the end-of-period pulse TEND to supply a trigger signal to triggerable flip-flop circuit 35. After this trigger signal is produced, the new count N in counter 31 is transferred into storage register 33, and then counter 31 is reset to an initial count in preparation for a subsequent clock pulse counting operation.

As shown in FIG. 5H, the trigger pulse supplied to triggerable flip-flop circuit 35 by comparator 34 changes the state of the flip-flop circuit such that the up/down control signal POL undergoes a positive transition to its relatively higher level. This controls up/down counter 36 to count in an upward direction, whereupon the end-of-period pulse TEND increments the count by one unit to a count of four.

Now, during the immediately succeeding interval, the count of counter 37 is compared to the count of four stored in up/down counter 36. The phase-modified control pulse CTL* is generated when counter 37 attains a count of four in coincidence with the count of the up/down counter. Hence, the phase shift imparted to this modified control pulse is increased, as shown in FIG. 5M.

During this interval, that is, during the interval that the count stored in up/down counter 36 is four, the phase of the phase-modified control pulse CTL* will be shifted relative to position pulse PGA' such that the tracking of magnetic heads MH deviates from the recorded video signal tracks VST. Consequently, the strength of the video signal which is reproduced during this interval is less than the strength of the video signal which had been reproduced during the immediately preceding interval, as shown by the reduced envelope of FIG. 5E. Accordingly, the width of clock control pulses $M_1$ is reduced during this interval, and the count accumulated by counter 31 during the scanning of sixteen tracks is less than the count which was accumulated during the immediately preceding interval and which now is stored in storage register 33. Therefore, after sixteen tracks have been scanned, that is, at the conclusion of the present interval, comparator 34 senses that the former count F is greater than the new count N so as to trigger triggerable flip-flop circuit 35. As shown in FIG. 5H, the state of flip-flop circuit 35 is changed so that up/down counter 36 now is controlled to count in the downward direction. The end-of-period pulse TEND now decrements the count of up/down counter 36 by one unit to a count of three.

During the immediately succeeding interval, that is, during the next interval while sixteen tracks are scanned, the phase-modified control pulse CTL* is phase shifted by an amount corresponding to a count of three. This, of course, is less than the phase shift which was imparted to the phase-modified control pulse during the immediately preceding line interval. Since this former phase shift had resulted in a mis-alignment of magnetic heads MH with video signal tracks VST, the new phase shift will improve this alignment and, thus, the signal strength of the video signal which is reproduced during this next interval will be greater than the signal strength of the video signal which was reproduced during the immediately preceding interval. This is shown in FIG. 5E.

Thus, it may be appreciated that if magnetic heads MH are mis-aligned with the video signal tracks VST scanned thereby, the phase-modified control pulse CTL* is phase-shifted in a direction to minimize this mis-alignment. Furthermore, the phase-modified control pulse CTL* is shifted by a different amount during each interval. If this phase shift during one interval results in improved tracking of the magnetic heads, then the strength of the video signal which is reproduced during this interval, and which is represented by the count stored in counter 31, will be greater than the strength of the video signal which was reproduced during the immediately preceding interval, and which is stored in storage register 33. Then, at the beginning of the immediately succeeding interval, the phase-modified control pulse CTL* is shifted by a predetermined amount, that is, by a unit increment, in the same direction as the phase shift which was imparted during the just-concluded interval. Such a phase shift will further improve the tracking of the magnetic heads and, therefore, will result in a reproduced video signal having a greater signal strength. This incremental phase shift in the phase-modified control pulse CTL* will continue in the same direction during each succeeding interval until the magnetic heads are brought into proper alignment with the video signal tracks scanned thereby. Then, during the next interval, the phase shift imparted to the phase-modified control pulse again will be in this same direction, but now will result in a slight mis-alignment of the magnetic heads with respect to the video signal tracks. Consequently, the video signal which is reproduced during this interval will have a signal strength that is less than the signal strength of the video signal reproduced during the immediately preceding interval, that is, the interval during which the magnetic heads were in proper alignment with the video signal tracks. As a consequence thereof, since the strength of the video signal which was reproduced during the immediately preceding interval is greater than the signal strength of the video signal which is reproduced during the present interval, the direction in which the phase-modified control pulse CTL* is shifted will be reversed at the beginning of the next following interval. This, of course, returns the magnetic heads into proper alignment with the video signal tracks. Then, during the following interval, an incremental phase shift in the same direction is imparted to the phase-modified control pulse, resulting in a slight mis-alignment between the magnetic heads and the video signal tracks. Accordingly, during the next following interval, the direction in which the phase-modified control pulse is shifted is reversed once again. Thus, it is seen that the phase of the phase-modified control pulse CTL* hunts about the precise phase relation thereof by a small incremental amount which has a negligible effect upon the video picture which ultimately is displayed from the reproduced video signals. Stated otherwise, the tracking servo control system in accordance with the present invention is operative always to search for a better tracking condition.

At the commencement of a reproducing operation, it is desirable to preset up/down counter 36 to a count midway of the counting range thereof. For example, if up/down counter 36 is capable of counting to a maximum of thirty-two, the counter may be preset to a count of sixteen. It is appreciated that such a preset count positions the phase-modified control pulse CTL* in the central portion of window pulse $D_3$ at the commencement of a reproducing operation. The automatic tracking servo control system disclosed in FIG. 4 then functions in the aforedescribed manner to shift the phase of this initial phase-modified control pulse until the desired tracking condition, discussed hereinabove, is attained.

It is recognized that the degree of phase shift imparted to the phase-modified control pulse CTL* is a function of the count present in up/down counter 36 and the frequency of timing pulses $CP_2$. For a given count in the up/down counter, the phase-modified control pulse undergoes a greater phase shift if the frequency of timing pulses $CP_2$ is lower. At the commencement of a reproducing operation, it is appreciated that the misalignment between magnetic heads MH and the video signal tracks VST scanned thereby, that is, the tracking error, is expected to be a maximum. Consequently, it is preferred to impart a phase shift of a greater degree to the phase-modified control pulse CTL* at the commencement of the reproducing operation, and then to reduce the degree of this phase shift to a smaller increment as the reproducing operation continues. To accomplish this, in another embodiment of the present invention, clock generator 23 is a variable clock generator adapted to generate timing pulses of a lower frequency, and thus a greater period or spacing between successive timing pulses, at the commencement of a reproducing operation and then to gradually increase the frequency of the timing pulses as the reproducing operation continues.

Figure 6:
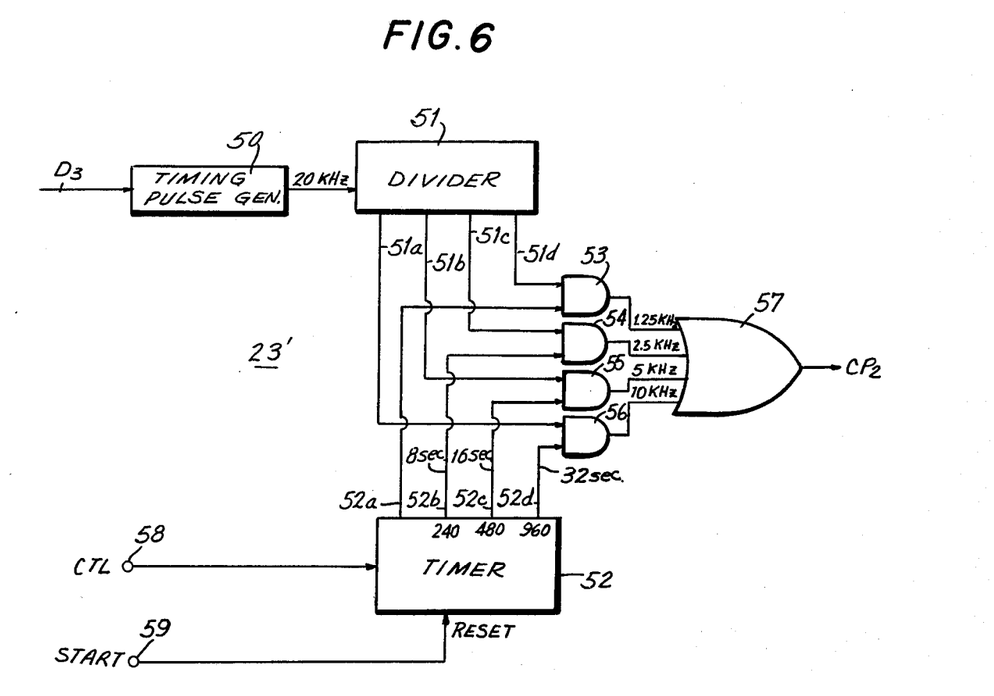
FIG. 6 is a logic diagram of one embodiment of a portion of the apparatus shown in FIG. 4.

Referring now to FIG. 6, there is illustrated a block diagram of a modified clock generator 23' which performs the aforementioned function. The modified clock generator is comprised of a timing pulse generator 50, a frequency divider 51, a timer 52, a set of AND gates 53–56 and an OR gate 57. Timing pulse generator 50 is responsive to the leading edge of window pulse $D_3$ to provide timing pulses at a relatively high frequency, for example, 20 KHz. The timing pulse generator is de-energized in response to the trailing edge of the window pulse. Hence, one construction of a suitable timing pulse generator would be an astable multivibrator whose output is gated by window pulse $D_3$.

The output of timing pulse generator 50 is coupled to frequency divider 51. The frequency divider includes a plurality of output terminals designated the divide-by-two output 51a, the divide-by-four 51b, the divide-by-eight output 51c and the divide-by-sixteen output 51d. Frequency divider 51 may comprise a conventional four-stage binary counting circuit with an output terminal coupled to each stage. Thus, the frequency of the timing pulses supplied to frequency divider 51 is divided by two at output terminal 51a, is divided by four at output terminal 51b, is divided by eight at output terminal 51c and is divided by sixteen at output terminal 51d. It is recognized that the frequency of the timing pulses provided at output terminal 51a is equal to 10 KHz, the frequency of the timing pulses provided at output terminal 51b is equal to 5 KHz, the frequency of the timing pulses provided at output terminal 51c is equal to 2.5 KHz and the frequency of the timing pulses provided at output 51d is equal to 1.25 KHz. Of course, if desired, the timing pulses generated by timing pulse generator 50 may have any other frequency as may be preferred, and the dividing ratios of the respective stages included in frequency divider 51 likewise may be any preferred dividing ratios.

Timer 52 is provided with respective outputs 52a, 52b, 52c and 52d. The timer is adapted to produce an enabling signal initially at output 52a at the commencement of a reproducing operation and then, at a predetermined time thereafter, to transfer this enabling signal to output 52b. Then, following another predetermined time interval, the enabling signal is transferred to output 52c; and at a further delayed time interval, the enabling signal is transferred to output 52d whereat it remains until the reproducing operation is completed. In order to accomplish this time-sequential transfer to an enabling signal, timer 52 may be a counter connected to an input terminal 58 to receive the reproduced control pulse CTL. It is recalled that the control pulse CTL is reproduced at a rate of thirty pulses per second. Therefore, by selecting the appropriate counter outputs for timer 52, the enabling signal will be transferred in the desired manner. Furthermore, in order to preset timer 52 at the commencement of a reproducing operation, a reset input thereof is coupled to an input terminal 59 to receive a START signal. Let it be assumed that, in operation, the enabling signal initially provided at output 52a of timer 52 is to be transferred to output 52b after eight seconds have elapsed. Accordingly, output 52b may be connected to the output of a counter stage which counts two hundred forty reproduced control pulses CTL. If the enabling signal then is to be transferred from output 52b to output 52c after sixteen seconds have elapsed, then output 52c may be connected to a counter stage which counts 480 reproduced control pulses. Finally, if the enabling signal is to be transferred from output 52c to output 52d after thirty-two seconds have elapsed, then output 52d may be connected to a counter stage which counts 960 reproduced control pulses.

AND gate 53 is connected to outputs 51d and 52a of frequency divider 51 and timer 52, respectively. AND gate 54 is connected to outputs 51c and 52b of frequency divider 51 and timer 52, respectively. AND gate 55 is connected to outputs 51b and 52c; and AND gate 56 is connected to outputs 51a and 52d of the frequency divider and timer, respectively. The outputs of AND gates 53-56 are connected to OR gate 57, the output of which constitutes the frequency-controlled timing pulses $CP_2$.

Briefly, in operation, at the commencement of a reproducing operation, timer 52 is reset so as to provide the enabling signal at its output 52a. This, in turn, conditions AND gate 53 to gate the frequency-divided timing pulses of a 1.25 KHz frequency to OR gate 57 during the occurrence of window pulse $D_3$. Thus, at each window pulse, timing pulses $CP_2$ which are supplied to counter 37 (FIG. 4) have the lowest frequency 1.25 KHz. This low frequency is maintained for eight seconds. At that time, timer 52 counts 240 reproduced control pulses CTL so as to transfer the enabling signal from output 52a to output 52b. This, in turn, conditions AND gate 54 to gate the frequency-divided timing pulses of 2.5 KHz frequency to OR gate 57. Hence, following the initial eight seconds interval, the frequency of timing pulses $CP_2$ is increased to 2.5 KHz.

After the reproducing operation has been performed for sixteen seconds, timer 52 will have counted 480 control pulses CTL so as to transfer the enabling signal from output 52b to output 52c. Consequently, AND gate 55 now is conditioned to gate the frequency-divided timing pulses of 5 KHz frequency to OR gate 57. Then, after 960 control pulses have been counted, that is, thirty-two seconds after the reproducing operation has commenced, the enabling signal is transferred from output 52c to output 52d, thereby conditioning AND gate to gate the frequency-divided timing pulses of 10 KHz frequency to OR gate 57.

Thus, it is seen that the modified clock generator 23', shown in FIG. 6, functions to progressively increase the frequency of the timing pulses $CP_2$ which are supplied to counter 37 as the reproducing operation continues. By increasing the frequency of these timing pulses, the degree of phase shift of the phase-modified control pulse CTL* during each interval gradually is reduced. That is, as the frequency of timing pulses $CP_2$ increases, the length of time required for counter 37 to achieve a count coincident with the count of up/down counter 36 is reduced. Consequently, since the tracking error is gretest at the commencement of the reproducing operation, the degree of phase shift of the phase-modified control pulse CTL* which is needed to correct this tracking error likewise is greatest. Hence, the incremental change in the tracking condition of the magnetic heads MH during each rotation thereof is greater at the commencement of the reproducing operation than at later times.

It, of course, should be appreciated that other timing circuits can be used in place of aforedescribed timer 52. Furthermore, if a timer formed of counting stages is employed, it is seen that the respective stages may be selected to count to different values. That is, the aforementioned eight seconds, sixteen seconds and thirty-two seconds time intervals at which the enabling signal is transferred from one timer output to another may be replaced by other time intervals, as desired. In the illustrated embodiment, it is appreciated that, once the enabling signal is transferred to timer output 52d, it is maintained thereat until the timer is reset.

From the foregoing discussion of FIG. 4, it is recognized that the rate at which up/down counter 36 is incremented or decremented determines the rate at which the phase-modified control pulse CTL is phase-shifted. Hence, while the frequency of timing pulses $CP_2$ determines the degree of phase shift of the modified control pulse, the rate at which the count of the up/down counter changes determines the rate at which this phase shift changes. It is further recognized that up/down counter 36 is incremented or decremented by each end-of-period pulse TEND. Consequently, the rate at which the count of the up/down counter changes is equal to the frequency of this end-of-period pulse. Since a greater tracking error is present at the commencement of the reproducing operation than at later times when a relatively stable condition is attained, it is preferred to increment or decrement the up/down counter at a faster rate at the commencement of the reproducing operation and then to progressively reduce this rate of change.

Figure 7:
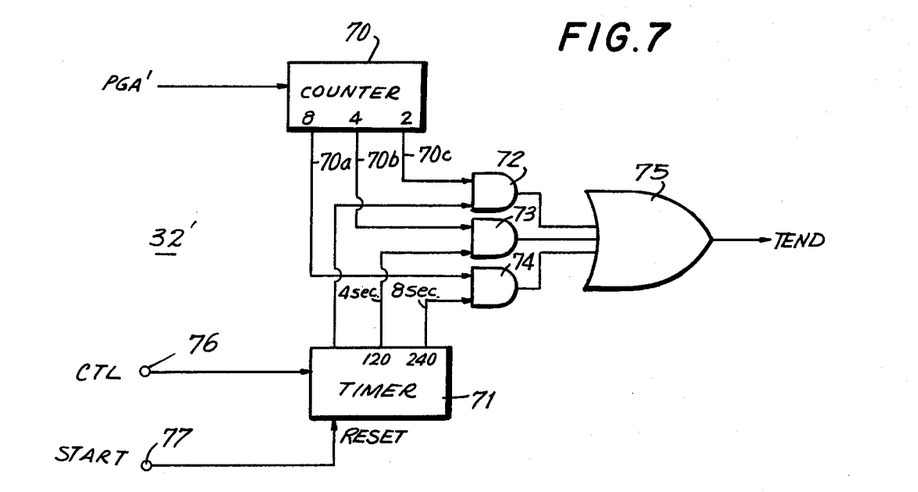
FIG. 7 is a logic diagram of an embodiment of another portion of the apparatus shown in FIG. 4.

The foregoing is achieved by the modified counter 32' shown in FIG. 7. In the embodiment discussed above with respect to FIG. 4, it has been assumed that counter 32 is an eight-count counter. That is, the end-of-period pulse TEND is generated after eight position pulses PGA' have been produced. Modified counter 32' (FIG. 7) varies the number of position pulses PGA' which must be counted in order to produce the end-of-period pulse TEND. That is, modified counter 32' functions to select different periodic intervals over which the strength of the reproduced video signal is measured. For example, at the commencement of a reproducing operation, the end-of-period pulse TEND may be generated after two position pulses PGA' (corresponding to the scanning of four tracks) have been generated. Then, after a predetermined time interval, for example, four seconds, modified counter 32' generates the end-of-period pulse TEND after four position pulses (corresponding to the scanning of eight tracks) have been generated. Then, following another predetermined time interval, for example, eight seconds following the commencement of the reproducing operation, counter 32' functions to generate the end-of-period pulse TEND after eight position pulses PGA' (corresponding to the scanning of sixteen tracks) have been generated.

The foregoing is achieved by the embodiment of modified counter 32' shown in FIG. 7 which comprises a counter 70 having outputs 70a, 70b and 70c at respective counter output stages thereof, a timer 71 having respective timer outputs 71a, 71b and 71c, AND gates 72–74 and an OR gate 75. Counter 70 is adapted to receive position pulses PGA' and may be similar to aforedescribed frequency divider 51. Accordingly, output 70a is adapted to produce a divide-by-eight output signal, that is, an output signal when eight position pulses have been counted. Output 70b is adapted to provide a divide-by-four output, that is, an output signal after four position pulses have been counted. Output 70c is adapted to provide a divide-by-two output signal, that is, an output signal after two position pulses have been counted. Output terminals 70a, 70b and 70c are connected to AND gates 74, 73 and 72, respectively.

Timer 71 is similar to timer 52 and may include a number of counting stages connected to receive the reproduced control pulse CTL at an input terminal 76. Timer 71 additionally is adapted to be reset in response to a START signal applied to a reset input terminal 77. Thus, it may be appreciated that timer 71 produces an enabling signal initially at its output 71a. This enabling signal is transferred to output 71b after 120 control pulses CTL have been counted, that is, four seconds following the commencement of the reproducing operation. Then, the enabling signal is transferred from output 71b to output 71c after 240 control pulses CTL have been counted, that is, eight seconds following the commencement of the reproducing operation.

In operation, at the commencement of the reproducing operation, the enabling signal is provided at output 71a of timer 71, thereby conditioning AND gate 72 to gate the divide-by-two output signal at output 70c. Hence, one output pulse is supplied through OR gate 75 as the end-of-period pulse TEND after every two position pulses PGA' have been counted. These relatively higher frequency end-of-period pulses are generated during the first four seconds of operation. At the end of these four seconds, the enabling signal is transferred from output 71a to output 71b, thereby enabling AND gate 73 to gate the divide-by-four output signal from counter 70 to OR gate 75. That is, during the next four seconds, the frequency of the end-of-period pulses TEND is reduced so that an end-of-period pulse is generated in response to every four position pulses PGA'.

Eight seconds following the commencement of the reproducing operation, the enabling signal is transferred from output 71b to output 71c. This conditions AND gate 74 to gate the divide-by-eight signal to OR gate 75. Hence, the frequency of the end-of-period pulses is further reduced so that an end-of-period pulse TEND is generated in response to every eight position pulses PGA'.

Thus, it is seen that the count of up/down counter 36 (FIG. 4) is changed at a relatively rapid rate, that is, after every four tracks have been scanned, at the commencement of the reproducing operation. The rate at which the count of this counter changes then progressively is reduced as the reproducing operation continues. Consequently, the rate at which the phase-modified control pulse CTL* is phase shifted correspondingly is reduced.

It is appreciated that, if desired, each position pulse PGA' may be utilized directly as the end-of-period pulse TEND during the commencement of a reproducing operation. Alternatively, other dividing ratios can be selected to produce the end-of-period pulses TEND. Likewise, the time intervals at which the frequency of the end-of-period pulses is reduced also can be changed to any other desired time intervals. It is appreciated that after the enabling signal has been transferred to output 71c of timer 71 it remains thereat until the timer is reset at the start of another reproducing operation.

While the present invention has been particularly shown and described with reference to various preferred embodiments, it should be readily apparent to those ordinary skill in the art that various changes and modifications in form and details may be made without departing from the spirit and scope of the invention. For example, counter 31 has been described as providing a measurement of the video signal which is reproduced from a number of tracks. This is intended to obtain an average video signal strength. It is recognized that such an average signal strength may not be used. In that event, counter 31 is reset in response to each position pulse PGA' or each of position pulses PGA' and PGB'. This means that the measured signal strength of the video signal which is reproduced from one track is compared to the measured signal strength of the video signal which is reproduced from the immediately preceding track, as represented by the count stored in storage register 33. Also, in the embodiment described above, clock control pulse $M_1$ is produced during the central portion of a scanned video track. This is because the detected envelope of the video signal reproduced from that scanned track is assumed to be more stable at the central portion of that track than at the beginning or end portions thereof, that is, when the magnetic head first comes into contact with the tape or leaves the tape. However, if there is no such stability consideration, then clock control pulse $M_1$ can be generated at the beginning or end of the scanning of a track, or any other desired location. This means that, if desired, delay pulse $D_1$ can be omitted. Furthermore, any other recording medium, such as a magnetic sheet or optical recording medium, can be used in place of magnetic tape. It is, therefore, intended that the appended claims be interpreted as including the foregoing as well as various other such changes and modifications.

What is claimed is:

1. In a servo control system of the type adapted to control the tracking of at least one rotary signal reproducing head which scans successive parallel record tracks on a movable record medium for reproducing information signals recorded in said tracks and including position pulse generating means for generating position pulses when said at least one head rotates into a predetermined position with respect to said record medium, a control transducer for reproducing control signals which are recorded along said movable record medium, and control means for controlling the relative position of said at least one head with respect to the tracks scanned thereby as a function of said position pulses and said reproduced control signal: the improvement comprising detecting means for detecting the relative strength of the information signal reproduced by said at least one head during periodic intervals; means for producing a phase shift signal in response to a difference between said relative signal strengths in successive periodic intervals, each said phase shift signal representing a predetermined increment of positive or negative phase shift for the control signal reproduced by said control transducer during each said periodic interval; phase shift means responsive to said phase shift signal for shifting the phase of each reproduced control signal; and means for supplying the phase shifted control signal to said control means.

2. The servo control system of claim 1 wherein said means for producing a phase shift signal includes direction control means for reversing the direction of the phase shift of the reproduced control signal in a succeeding interval relative to the phase shift of the reproduced control signal in a just-concluded interval if the relative signal strength during said just-concluded interval is less than the relative signal strength during the immediately preceding interval, and for maintaining the direction of the phase shift of the reproduced control signals in a succeeding interval equal to the direction of the phase shift of the reproduced control signals during a just-concluded interval if the relative signal strength during said just-concluded interval is greater than the relative signal strength during the immediately preceding interval.

3. The servo control system of claim 2 wherein said detecting means comprises first counting means for generating a digital count representing the strength of the information signal reproduced by said at least one head during a just-concluded interval; and said means for producing a phase shift signal comprises temporary storage means for storing the digital count generated during the immediately preceding interval, comparator means for comparing the generated digital count to the stored digital count, and up/down counter means whose count is changed periodically by a unit amount and in a direction opposite to the preceding change thereof if said stored digital count exceeds said generated digital count and in the same direction as the preceding change thereof if said stored digital count is less than said generated digital count.

4. The servo control system of claim 1 wherein said detecting means comprises first counting means for generating a digital count representing the relative strength of the signal reproduced by said at least one head during a just-concluded interval; and said means for producing a phase shift signal comprises temporary storage means for storing the digital count generated during the immediately preceding interval, comparator means for comparing the generated digital count to the stored digital count, and up/down counter means whose count is changed periodically by a unit amount and in a direction opposite to the preceding change thereof if said stored digital count exceeds said generated digital count and in the same direction as the preceding change thereof if said stored digital count is less than said generated digital count.

5. The servo control system of claim 4 wherein said phase shift means comprises window pulse generating means responsive to each reproduced control signal for generating a window pulse of predetermined duration; and means for producing a replica of said control signal at a location within said window pulse corresponding to the count of said up/down counter means.

6. The servo control system of claim 5 wherein said means for producing a replica of said control signal comprises a source of timing pulses generated during said window pulse duration; timing pulse counting means for counting said timing pulses; and coincidence means for comparing the count of said timing pulse counting means to the count of said up/down counter means to produce a replica of said control signal when said count of said timing pulse counting means corresponds to said count of said up/down counter means.

7. The servo control system of claim 6 wherein the count of said timing pulse counting means is incremented at a slower rate during the beginning of a reproducing operation so that the replica of said control signal is provided with a larger phase shift relative to said reproduced control signal for the same count of said up/down counter means.

8. The servo control system of claim 7 wherein said source of timing pulses comprises timing pulse generating means for generating a train of timing pulses at a relatively high frequency; frequency dividing means coupled to said timing pulse generating means and having a plurality of outputs for providing frequency-divided timing pulses of different lower frequencies at respective ones of said outputs; timing means energized at the beginning of a reproducing operation to produce timing signals defining different time periods; and gating means coupled to said timing means and to said respective outputs of said frequency dividing means for supplying frequency-divided timing pulses of lowest frequency during an initial time period and frequency-divided timing pulses of progressively increasing frequency during succeeding time periods.

9. The servo control system of claim 4 wherein said periodic interval is equal to the time for said at least one head to scan a number of tracks, said number increasing progressively from the start of a reproducing operation so that the rate at which said control signal is phase shifted decreases from a faster rate at said start of said reproducing operation.

10. The servo control system of claim 9 further comprising second counting means for counting said generated position pulses to produce respectively different periodic count outputs; timing means energized at the beginning of a reproducing operation to produce timing signals defining different time periods; gating means coupled to said timing means and to said second counting means for supplying the lowest count output during an initial time period and progressively higher count outputs during succeeding time periods; and means for supplying the count output from said gating means to said up/down counter means to be counted thereby and to said first counting means and said temporary storage means to reset said first counting means and to load said temporary storage means.

11. The servo control system of claim 10 further comprising triggerable flip-flop means triggerable between first and second states, said first state controlling said up/down counter means to increment the count thereof in response to the count output from said gating means and said second state controlling said up/down counter means to decrement the count thereof in response to the count output from said gating means, said triggerable flip-flop means being coupled to said comparator means to be triggered only when said stored digital count exceeds said generated digital count.

12. In a servo control system of the type adapted to control the tracking of a pair of rotary signal reproducing heads which scan successive parallel record tracks of a movable magnetic tape to reproduce information recorded therein, said magnetic tape including periodic control pulses recorded along a longitudinal edge thereof in predetermined relation in respect to said record tracks, said servo system including position pulse generating means for generating position pulses when said heads rotate into predetermined positions with respect to said tape, a control transducer for reproducing said control pulses, and control means responsive to said generated position pulses and to said control pulses for controlling the movement of said tape and thus the position of said heads relative to the tracks scanned thereby, the improvement comprising pulse generating means for generating a pulse when a head scans a central portion of a record track; envelope detecting means for detecting the envelope of the information reproduced by each head and for controlling the width of said generated pulse as a function of said detected envelope; means for defining an interval equal to at least the time required for the scanning of two record tracks; measuring means for measuring the width of said generated pulses during each interval; comparator means for comparing the width of the last-mentioned pulses generated during the just-concluded interval with the width of said last-mentioned pulses generated during the immediately preceding interval; counting means whose count is changed by a predetermined amount at the conclusion of each interval, the change being reversed from the preceding change if the width of said last-mentioned pulses generated during said immediately preceding interval exceeds the width of said last-mentioned pulses generated during said just-concluded interval, and the change being in the same direction as the preceding change if the width of said last-mentioned pulses generated during said immediately preceding interval is less than the width of said last-mentioned pulses generated during said just-concluded interval; and phase shift means for shifting the phase of each said reproduced control pulse by an amount determined by the count of said counting means.

13. The servo control system of claim 12 wherein said phase shift means comprises window pulse generating means responsive to the reproduction of each control pulse to generate a window pulse of predetermined duration; and means for generating a phase-shifted replica of said control pulse at a time during said window pulse determined by said count of said counting means.

14. The servo control system of claim 13 wherein said means for generating a phase-shifted replica of said control pulse comprises clock generating means energized by the leading edge of said window pulse for generating clock pulses and de-energized by the trailing edge of said window pulse; clock counting means coupled to said clock generating means for counting said clock pulses; and coincidence means coupled to said clock counting means and to said first-mentioned counting means for generating said phase-shifted replica of said control pulse when the count of said clock counting means is equal to the count of said first-mentioned counting means.

15. The servo control system of claim 14 wherein said clock generating means comprises a source of timing pulses energized by the leading edge of said window pulse to generate timing pulses and de-energized by the trailing edge of said window pulse; timing pulse counting means for counting said timing pulses, said timing pulse counting means including a plurality of outputs for generating periodic output pulses having progressively decreasing frequencies as said timing pulses are counted; timing means responsive to said reproduced control pulses for producing a first timing output signal at the start of a reproducing operation and successive timing output signals as said reproducing operation continues; and gating means coupled to said timing pulse counting means and to said timing means for producing said clock pulses, said gating means being responsive to said first timing output signal for gating the periodic output pulses having the lowest frequency and being responsive to successive timing output signals for gating periodic output pulses having progressively increasing frequencies.

16. The servo control system of claim 12 wherein said measuring means comprises clock generating means energized by the leading edge of said generated pulse for generating clock pulses and de-energized by the trailing edge of said generated pulse; and clock counting means coupled to said clock generating means for counting said clock pulses, the count of said clock counting means being a measure of the width of said generated pulse, and said count being reset at the completion of each said interval.

17. The servo control system of claim 16 wherein said comparator means comprises register means actuated at the completion of each said interval to store the count of said clock counting means prior to the resetting of said clock counting means; and a comparator for comparing the count of said clock counting means to the count stored in said register means, said comparator being actuated at the completion of each said interval to produce an output pulse only if the count of said register means exceeds the count of said clock counting means.

18. The servo control system of claim 17 wherein said first-mentioned counting means comprises an up/down counter whose count is incremented or decremented by a unit count at the completion of each said interval; and triggerable bi-state means coupled to said up/down counter for determining the direction in which said up/down counter counts, the state of said bi-state means being changed in response to each output pulse produced by said comparator between a first state effective to cause said up/down counter to count up and a second state effective to cause said up/down counter to count down.

19. The servo control system of claim 18 wherein said means for defining an interval comprises position pulse counting means for counting said position pulses, said position pulse counting means including a plurality of outputs for generating periodic output pulses having progressively increasing periods as said position pulses are counted; timing means responsive to said reproduced control pulses for producing a first timing output signal at the start of a reproducing operation and successive timing output signals as said reproducing operation continues; and gating means coupled to said pulse counting means and to said timing means for producing interval-defining pulses, said gating means being responsive to said first timing output signal for gating the periodic output pulses having the shortest period and being responsive to successive timing output signals for gating periodic output pulses having progressively increasing periods.

* * * * *